(12) United States Patent
Tao et al.

(10) Patent No.: US 10,052,759 B2
(45) Date of Patent: Aug. 21, 2018

(54) ADAPTIVE CONTROL OF ROBOTIC LASER BRAZE/WELD OPERATION

(71) Applicant: Fanuc America Corporation, Rochester Hills, MI (US)

(72) Inventors: Jianming Tao, Troy, MI (US); Charles R. Strybis, Shelby Township, MI (US); Bradley Niederquell, Troy, MI (US); Jason Tsai, Bloomfield Hills, MI (US)

(73) Assignee: FANUC AMERICA CORPORATION, Rochester Hills, MI (US)

( * ) Notice: Subject to any disclaimer, the term of this patent is extended or adjusted under 35 U.S.C. 154(b) by 0 days.

(21) Appl. No.: 14/228,318

(22) Filed: Mar. 28, 2014

(65) Prior Publication Data

US 2014/0297033 A1    Oct. 2, 2014

Related U.S. Application Data

(60) Provisional application No. 61/808,328, filed on Apr. 4, 2013, provisional application No. 61/806,433, filed on Mar. 29, 2013.

(51) Int. Cl.
| | |
|---|---|
| *G05B 19/04* | (2006.01) |
| *G05B 19/18* | (2006.01) |
| *B25J 9/16* | (2006.01) |

(52) U.S. Cl.
CPC .......... *B25J 9/1602* (2013.01); *Y10S 901/42* (2013.01)

(58) Field of Classification Search
CPC ...... B25J 9/1602; B25J 9/1669; B25J 9/1682; G05B 2219/33097; G05B 2219/33144; G05B 2219/33274; G05B 2219/34398; G05B 2219/34397; G05B 2219/39129; G05B 2219/40307; Y10S 901/42
USPC .......................................................... 700/250
See application file for complete search history.

(56) References Cited

U.S. PATENT DOCUMENTS

| | | | | |
|---|---|---|---|---|
| 4,529,864 A | * | 7/1985 | Bennett | .................. B23K 9/091 219/137 PS |
| 6,429,404 B1 | * | 8/2002 | Suzuki | ................. B23K 9/0216 219/124.34 |
| 6,434,448 B1 | * | 8/2002 | Kosaka | .................. B25J 9/1674 318/568.11 |
| 2003/0033052 A1 | * | 2/2003 | Hillen | .................. G05B 19/042 700/212 |
| 2006/0287769 A1 | * | 12/2006 | Yanagita | ................ B25J 9/1669 700/245 |

(Continued)

*Primary Examiner* — Harry Y Oh
(74) *Attorney, Agent, or Firm* — William J. Clemens; Shumaker, Loop & Kendrick, LLP

(57) ABSTRACT

A method for adaptive control of a robotic operation of a robot includes providing a software program to generate process signals executable during the robotic operation, including one or more execution commands. A first Signal Value channel is provided to control at least one control process parameter of the robot, where the first Signal Value channel is subject to a first time latency. The execution timing of the first Signal Value channel is synchronized with the one or more execution commands by accounting for the first time latency in relation to the one or more execution commands. The software program is run to generate the process signals and the robot is operated in response to the synchronized execution timing of the execution commands.

20 Claims, 4 Drawing Sheets

(56) References Cited

U.S. PATENT DOCUMENTS

| | | | |
|---|---|---|---|
| 2007/0050085 A1* | 3/2007 | Hashimoto | H04J 3/0667 700/245 |
| 2008/0161964 A1* | 7/2008 | Irie | B23K 26/0884 700/166 |
| 2012/0298639 A1* | 11/2012 | Wang | B23K 9/124 219/121.64 |
| 2013/0200053 A1* | 8/2013 | Bordatchev | B23K 26/04 219/121.78 |
| 2014/0203007 A1* | 7/2014 | Uecker | B23K 9/1068 219/130.51 |

* cited by examiner

ADAPTIVE CONTROL OF ROBOTIC LASER BRAZE/WELD OPERATION

CROSS-REFERENCE TO RELATED APPLICATION

This Application claims the benefit of U.S. provisional patent application Ser. No. 61/806,433 filed Mar. 29, 2013, and further claims the benefit of U.S. provisional patent application Ser. No. 61/808,328 filed Apr. 4, 2013.

FIELD OF THE INVENTION

This invention relates to robot controls and, more particularly, the invention is directed to an adaptive control of a robotic laser braze/weld operation.

BACKGROUND OF THE INVENTION

The robotic laser braze/weld has become more popular now in the automotive manufacturing industry due to its precision, low thermal distortion, and efficiency. Many automotive OEMs have started to use robotic laser braze/weld to manufacture car roofs and decklids, especially, for aluminum welding.

Current robotic laser braze/weld tools use a software program to generate process signals such as Command Wire Feed Speed and Start of Wire Feed to a wire feeding device, and process signals such as Command Laser Power and Laser Emission to a laser beam generator. All of these signals are controlled via an Arc Start and an Arc End instruction. The current software does not have adequate signal timing adjustment capability to meet the requirement for the laser braze/weld process. The process is not optimal because process parameters such as the wire feed speed and the laser power are always based on the commanded values specified in the weld schedule and are not adaptive to the actual tool speed, which is typically measured at the Tool Center Point (TCP). As a non-limiting example, when wire feed speed is based on commanded values, it is difficult to synchronize the timing control between the laser power and the wire feed speed during laser power changes.

The robotic laser braze/weld application therefore requires flexible and accurate timing synchronization control for various third party devices and process parameters, such as the laser power, gas flow, wire temperature and wire feed speed, for example. Acceptable laser braze/weld performance further requires adaptive control process parameters. In particular, acceptable laser braze/weld performance requires that process parameters be controlled independently with respect to the actual welding speed.

For example, during corner motion, the actual move speed of the welding tool at a corner region can be substantially slower than the commanded speed. Similarly, during tool beginning and end of motion, as well as during directional changes and during changes in speed, the welding tool is subject to an acceleration or deceleration that causes an actual move speed of the robot welding tool to change. In order to compensate, the weld parameters must be dynamically updated based on the actual weld speed to guarantee laser weld quality. During acceleration or deceleration of the robot welding tool, it is desirable to provide independent ramp control for process parameters based on actual robot acceleration or deceleration at the start or at the end of the laser braze/weld operation. The ability to adapt the braze/weld process parameters to the weld speed is critical in laser applications where the laser can quickly cut a hole in the material being welded or feed more wire than is needed. Without the adaptive capability, the developing, programming, and validating of the weld schedules is tedious, time consuming and difficult.

It would be desirable to provide a laser braze/weld system and method wherein process parameters are controlled independently with respect to the actual welding speed. It would also be desirable to provide a laser braze/weld system and method wherein process parameters are adaptive to the actual tool center point speed.

SUMMARY OF THE INVENTION

In concordance with the instant disclosure, a laser braze/weld system and method wherein process parameters are controlled independently with respect to the actual welding speed, and wherein process parameters are adaptive to the actual tool center point speed, has surprisingly been discovered.

In one embodiment, a method for adaptive control of a robotic operation by a robot is provided. A software program is provided to generate process signals executable during the robotic operation by the robot, including one or more execution commands. A first Signal Value channel is provided for at least one control process parameter of the robot, where the first Signal Value channel is subject to a first time latency. Execution timing of the first Signal Value channel is synchronized with the one or more execution commands by accounting for the first time latency in relation to the one or more execution commands. The software program is run to generate the process signals and the robot is operated in response to the synchronized execution timing of the execution commands.

In one embodiment, the execution timing of the first Signal Value channel is delayed by the amount of the first time latency upon receipt of the one or more execution commands.

In another embodiment, a first Signal On channel is provided for the at least one control process parameter, wherein the first Signal On channel is subject to a second time latency. Execution timing of the first Signal On channel is synchronized with the one or more execution commands by accounting for the second time latency in relation to the one or more execution commands.

In another embodiment, a software program is provided to generate process signals executable during the robotic operation of the robot, including one or more execution commands specified in a weld schedule. A first Signal Value channel is provided to control at least one laser braze/weld process parameter of the robot, where Um first Signal Value channel is subject to a first time latency in relation to the one or more execution commands. Execution timing of the first Signal Value channel is synchronized with the one or more execution commands by adjusting the execution timing of first Signal Value channel in relation to the one or more execution commands by the amount of the first time latency. The software program is run to generate the process signals and the robot is operated in response to the synchronized execution timing of the execution commands. An actual speed of the laser braze/weld operation by the robot may be tracked, and independent and adaptive control of the first Signal Value channel in relation to the speed of the laser blaze/weld operation may be provided. The at least one laser braze/weld process parameter includes execution commands for at least one of laser power, laser on/off, wire feed speed, wire feed on/off, dual wire feed speed, dual wire feed on/off, gas flow, gas flow on/of, gas speed, gas pressure, gas temperature, wire temperature, wire preheat, and wire preheat on/off.

An apparatus for adaptive control of a robotic laser braze/weld operation is also disclosed. The apparatus includes a robot controller, a robot arm carrying a brazing/welding tool connected to the controller, and a non-transitory memory device connected to the controller and storing a software program executed by the controller for coordinating a movement of the robot. The software program generates process signals executable during the robotic operation including one or more execution commands specified in a weld schedule. A first Signal Value channel controls at least one laser braze/weld operation process parameter. The first Signal Value channel is subject to a first time latency in relation to the one or more execution commands. The software program synchronizes execution timing of the first Signal Value channel with the one or more execution commands by adjusting the execution timing of first Signal Value channel in relation to the one or more execution commands by the amount of the first time latency.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
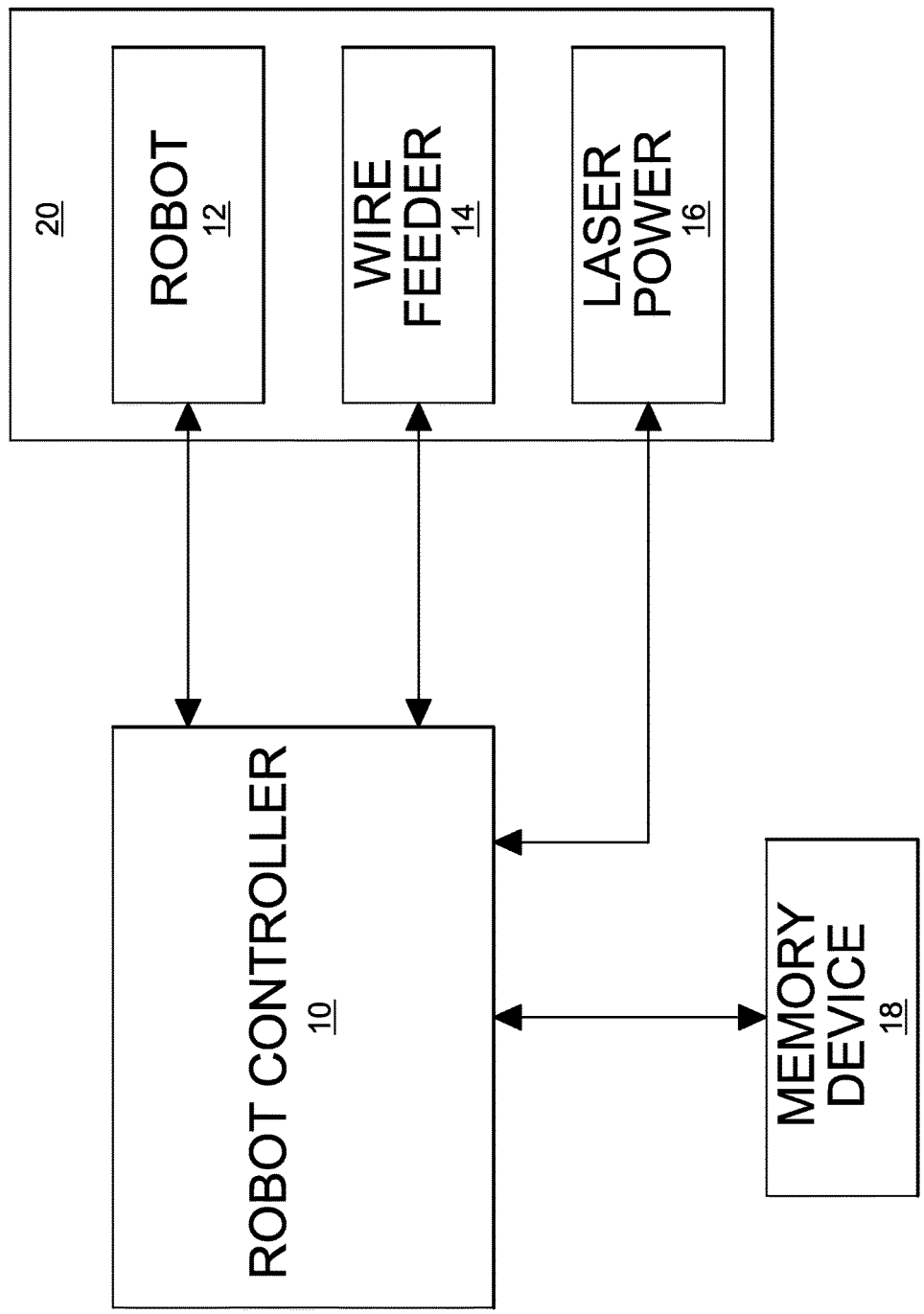
FIG. 1 is a schematic block diagram of an apparatus for performing adaptive control of a robotic laser braze/weld operation according to the invention.

As shown in FIG. 1 an apparatus for performing the adaptive control of a robotic laser braze/weld operation includes a robot controller 10 controlling the movement of a robot arm 12 that carries the brazing/welding tools. The controller 10 also controls process parameters 20 that affect the brazing/welding operation. As non-limiting examples, such process parameters 18 may include the wire feed rate of a wire feeder 14 and the power value of a laser power supply 16. A software program for coordinating the robot movement, wire feed rate and laser power is stored in a non-transitory memory device 18 connected to the controller 10.

The present invention recognizes and accounts for the fact that each of the process parameters 20 in FIG. 1 is subject to a time latency between a time that a process command is initially given and a time the process command begins executing. Moreover, each of the process parameters 20 is usually subject to a different time latency than any of the other process parameters.

Figure 2:
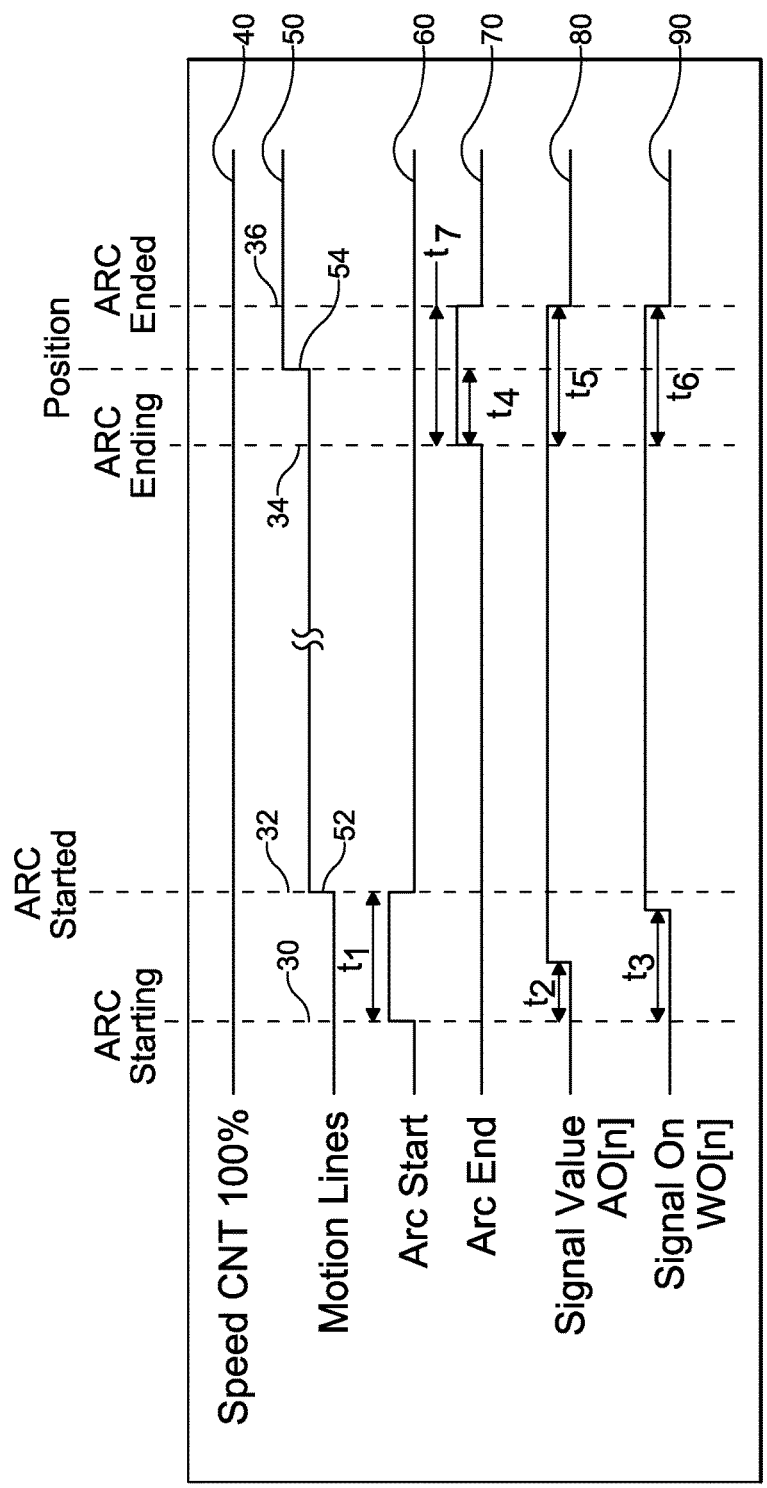
FIG. 2 illustrates the timing relationships between process parameters during a laser braze/weld process according to the invention.
Figure 3:
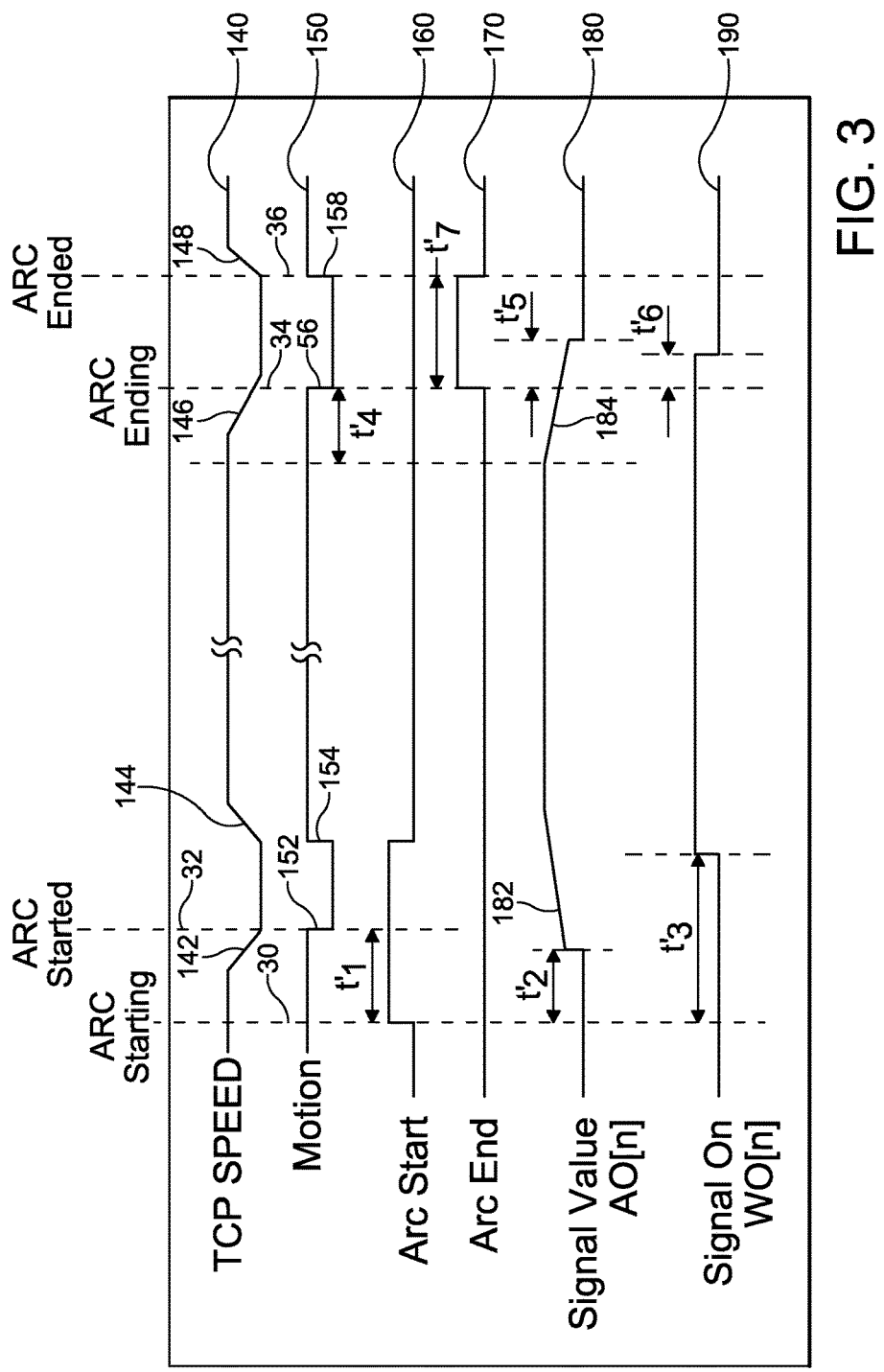
FIG. 3 illustrates a generic ramping process in conjunction with the timing relationships between process parameters during a laser braze/weld process according to the invention.
Figure 4:
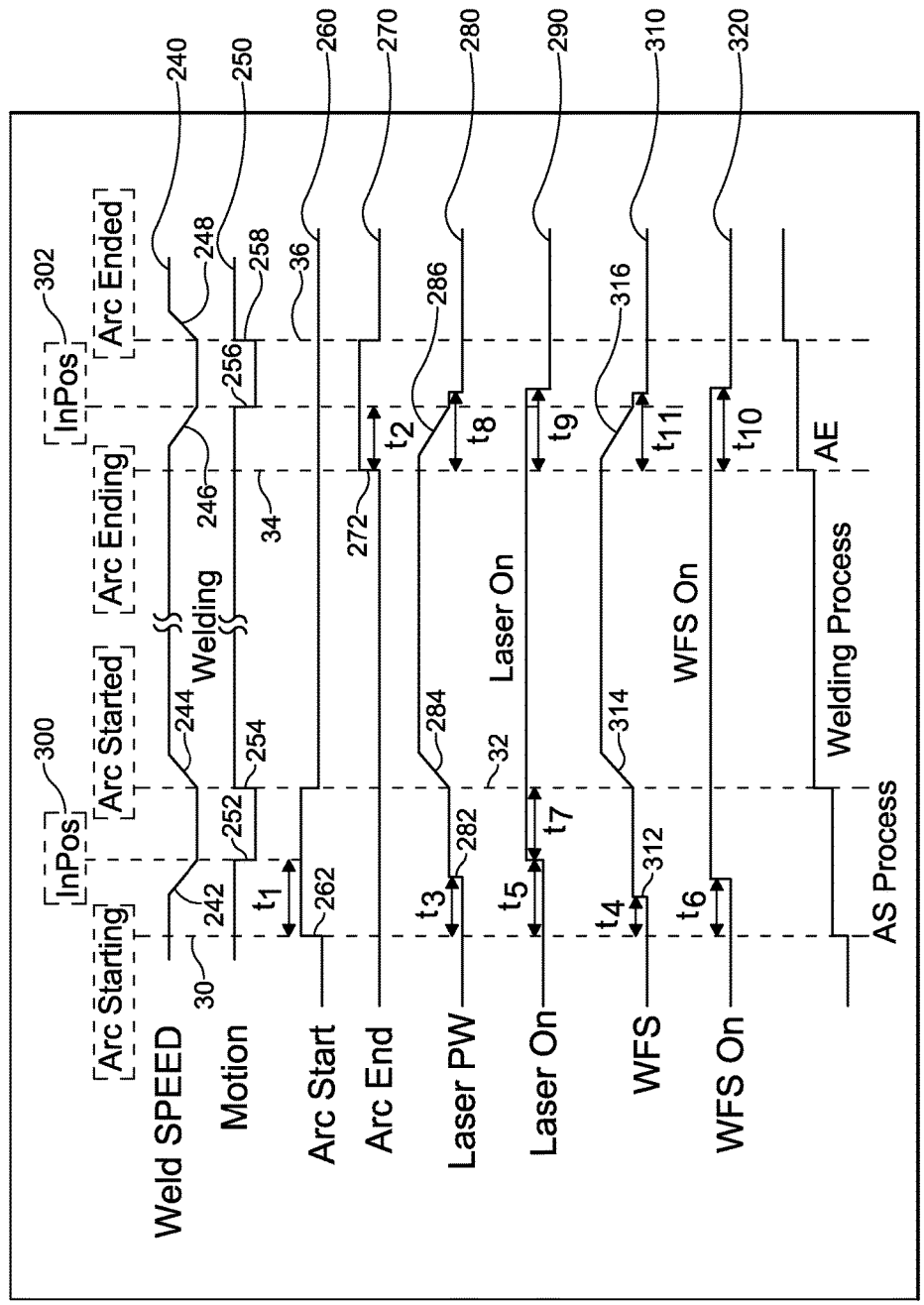
FIG. 4 illustrates the ramping process of FIG. 3 in conjunction with the timing relationships between two exemplary process parameters each with two control channels during a laser braze/weld process according to the invention.

Exemplary relationships between the timing of such process parameters 20 are generally shown with reference to FIG. 2-4. The exemplary time relationships between process parameters in FIG. 2-4 are particularly shown with reference to an Arc Starting time 30, an Arc Started time 32, an Arc Ending time 34, and an Arc Ended time 36 for both FINE and CNT100 (corner) move types in the laser braze/weld process. Each of the horizontal timing lines of FIGS. 2-4 represent process timing pulses where a control pulse or command is initiated or changed by the software control program to effect a response to a process parameter, such as part motion, robot motion, wire feed, wire speed, laser on, laser power level, and the like. It is understood that the control pulse or command may be any commonly used control scheme, digital or analog.

FIG. 2 specifies a generic process signal timing sequence in a CNT100 (corner) move type between Arc Starting and Arc Ended. Each channel has similar control capability, and each channel further accounts for only specific time latencies associated with the process parameter controlled by that channel. The corner brazing/welding speed of timeline 40 shows the desired constant weld speed through the corner brazing/welding operation. However, the Motion line 50 shows the speed of the tool relative to the line that is required in order to maintain the corner brazing/welding speed of timeline 40 constant. In particular, a weld motion start command 52 is provided so that the motion of the line commences concurrently with the Arc Started time 32. A separate weld motion stop command 54 is provided to signal the end of commanded motion on motion line 50 in advance of the Arc Ended time 36.

To ensure that the Arc Started time 32 coincides with the weld start motion command 52, the present invention accounts for a time latency $t_1$ between the Arc Starting time 30 and the Arc Started time 32. Thus, the Arc Started time 32 is specified as the Arc Starting time 30 plus the time latency $t_1$. In other words, the Arc Start signal, shown in timeline 60 of FIG. 2, must be commanded in advance of the expected Arc Started time 32 by the amount of the time latency $t_1$. Similarly, the Arc End signal, shown in the timeline 70, must be commanded in advance of the Arc Ended time 36 by an amount of the time latency $t_7$. It is understood that time latency $t_1$ may or may not be equal to the time latency $t_7$. It is also understood that the time latency $t_1$ may be independent of the time latency $t_7$, which is why the Arc Start signal 60 is controlled by a separate channel than the Arc End signal 70.

For any process control parameter A utilized in the brazing/welding operation, both a Signal Value channel, shown as timeline 80, and a Signal On channel, shown as timeline 90, are provided, because each process control parameter is associated with its own signal value, and because each process or control associated with the brazing/welding operation is subject to an independent and known time latency associated with that process parameter. It is understood that the Signal On channel can control a motion of a portion of the laser braze/weld operation, such as motion of the robot arm, or may further control activation and/or deactivation of a portion of the laser braze/weld operation, such as activation and/or deactivation of the laser. For example, a process control parameter associated with a laser requires a Signal Value channel to control a process parameter associated with the laser, such as laser power level, and further requires a Signal On channel to indicate when the laser will be turned on or off. Additionally, for the process control parameter A, a known time latency $t_2$ exists that represents the delay time of the Signal Value and the realization of the signal value in advance of the Arc Started time 32. For example, the process control parameter Signal Value may call for 50% laser power when the laser turns on, but that power setting must be set in advance of the laser being actually turned on. Thus, according to the present invention, the control system adjusts the time latency $t_2$ in relation to the Arc Start time latency $t_1$ to achieve a desired Signal Value 80 in advance of the Arc Starting time 32.

Similarly, when any change to the process parameter Signal Value is made, a known time latency $t_5$ exists that represents the delay time of the Signal Value change in advance of the actual change to the Signal Value. Thus, as shown in FIG. 2, the Signal Value change on timeline 80 is called for at the Arc Ending time 34, but does not take effect until a time $t_5$ after the Arc Ending time 34. Thus, the control channel 80 accounts for the time latency $t_5$ associated with the change to the Signal Value of the process parameter in relation to the time latency $t_7$ to achieve a desired Signal Value 80 in advance of the Arc Ended time 36. As seen in FIG. 2, the Arc Ending signal of timeline 70 is provided a time $t_7$ prior to the Arc Ended time 36, which also coincides with a time $t_4$ prior to a Motion signal end signal on timeline 50. The Arc Ending Signal is also made a time $t_5$ prior to the Signal Value change relative to the Arc Ended time 36.

In the same way, the present invention accounts for an independent time latency $t_3$ that exists between the Arc Starting signal 30 and the time the Signal On channel signal turns on in timeline 90 to ensure that the Signal On channel turns on precisely at the Arc Started time 32. Thus, the present invention allows the control system to adjust the Signal On time latency $t_3$ in relation to the Arc Start time latency $t_1$ to synchronize the Signal On channel on signal with the Arc Started time 32. In the same way, the present invention accounts for the time latency $t_6$ of the Signal On channel in relation to the Arc End signal time latency $t_7$ to ensure that the Signal On channel 90 turns off at precisely the Arc Ended time 36.

Importantly, each control channel independently accounts for any time latency associated with that control channel, which is necessary because each of the time latencies t2 (first time latency), $t_3$ (second time latency), $t_5$ (third time latency) and $t_6$ (fourth time latency) are independent of each other, even between Signal Value and Signal On channels controlling the same device. Moreover, each control channel is able to provide its own On and Off control parameters. Thus, any process parameter associated with the brazing/welding operation may be precisely controlled. The present invention provides precise signal timing adjustment capability, which optimizes the precision and utility of the laser braze/weld process by synchronizing the timing control between all process parameters during the laser braze/weld operation.

In an additional embodiment of the present invention, each of the control channels is also capable of adapting the control signal to the actual speed of the brazing/welding operation. As a non-limiting example, a speed of the laser braze/weld operation, and a position of tools performing the brazing/welding operation, may be measured relative to a Tool Center Point (TCP) indicated by known methods, or may be measured by any other known methods with reference to a known point on the tool or on the part undergoing the laser braze/weld operation. As noted above, particularly with respect to start/stop motion of the tool and tool directional changes, the tool is subject to acceleration forces that vary the speed of the tool. For example, the actual move speed of the welding tool at a corner region can be substantially slower than the commanded speed.

The present invention compensates for tool speed changes, as well as for changes to any process parameter, by allowing for independent and adaptive control of any process parameter in the laser braze/weld operation. FIG. 3 specifies a generic process signal timing sequence in a variable speed FINE move type between Arc Starting time 30 and Arc Ended time 36.

Each channel displayed in FIG. 3 has similar control capability, and each channel further accounts for only specific time latencies associated with the process parameter controlled by that channel. The TCP brazing/welding speed of timeline 140 shows a desired variable weld speed through a tool motion adjustment, shown in timeline 150. Timeline 160 controls a Signal Start channel, and timeline 170 controls a Signal End channel associated with the Signal Start channel of timeline 160.

In FIG. 3, the weld motion line receives an "off" signal 152 at the Arc Started time 32. Instead of abruptly stopping, which may be physically impossible, the TCP speed adapts to the motion characteristics of the tool adaptively reducing the TCP Speed at point 142 to ensure that the TCP speed is zero concurrently with the motion stop signal 152. The Motion channel sends an "on" signal at 154, which is also matched by an adaptive increase in TCP speed at 144. Subsequently, the Motion channel 150 receives an "off" signal 156 at the Arc Ending time 34 that is matched by an adaptive reduction 146 of the TCP speed. The Motion channel 150 additionally receives an "on" signal at 158 coincident with the Arc Ended time 36 that is matched by an adaptive increase 148 of TCP speed.

Similarly, the Signal Value signal shown by timeline 180 provides an adaptive increase in the Signal Value to match the TCP Speed timeline 140. In particular, the Signal Value signal slowly increases over a longer time period at point 182 to adapt the Signal Value parameter to the TCP speed increase at 144. Subsequently, the Signal Value signal slowly and adaptively reduces at 184 to adapt the Signal Value parameter to the TCP speed decrease at 146. Thus, the present invention enables a user to adaptively control process parameters associated with the laser braze/weld operation.

Varying adaptive control algorithms may be used to control the speed and rapidity of the changes to process parameter values. The present invention allows the use of any adaptive control algorithm. As a non-limiting example, one exemplary adaptive control algorithm useful in the present invention is provided below as Equation 1.

$$\text{speed\_ratio} = \text{act\_speed}/\text{cmd\_speed} \quad \text{where } 0 \leq \text{speed\_ratio} \leq 1$$

$$lpw = \text{cmd\_lpw}(1 - k_1^*(1-\text{speed\_ratio})) \quad \text{where } 0 \leq k_1 \leq 1 \text{ and } lpw_{min} \leq lpw \leq \text{cmd\_lpw}$$

$$wfs = \text{cmd\_wfs}(1 - k_2^*(1-\text{speed\_ratio})) \quad \text{where } 0 \leq k_2 \leq 1 \text{ and } wfs_{min} \leq wfs \leq \text{cmd\_wfs}.$$

Equation 1

Equation 1 describes a simple proportional control adaptive algorithm, wherein (a) cmd_speed is the command weld speed specified in weld schedule;
(b) act_speed is the measured weld speed;
(c) speed_ratio is limited to less than 1.0;
(d) cmd_lpw is the command laser power specified in weld schedule;
(e) lpw is the adjusted laser power;
(f) wfs is the adjusted wire feed speed;
(g) k1 and k2 are the control gains for lpw and wfs respectively;
(h) lpwmin is the user defined low bound for adjusted laser power; and
(i) wfsmin is the user defined low bound for adjusted wire feed.

Using the algorithm of Equation 1, if control gain is zero or actual weld speed is equal to a commanded weld speed, there is no adjustment to the command process parameters. If an actual weld speed is slower than a commanded weld speed, the process parameters will be reduced proportionally and the gain is used to control the reduction rate. The control granularity of any adaptive control algorithm may be set at any interpolate loop time, or may be set at a multiple of interpolate loop times. It is further possible to apply the update frequency to some or all of the control channels simultaneously.

Additional adaptive control methods are also available. In one embodiment of the invention, four different adaptive control methods are provided to a user of the present invention that allow adaptive control of process parameters to adapt the process parameters to motion acceleration and deceleration at Arc Starting, Arc Ending, or at schedule changes during a laser braze/weld operation. A first adaptive control method applies no ramping to the control either at acceleration or at deceleration of the tool. In the first adaptive control method, the Signal Value will start at a commanded value and will maintain that value through acceleration of the laser braze/weld tool, or will maintain a current value through deceleration of the tool, or both. This first adaptive control method is known as a Zero Ramp control method.

A second adaptive control method utilizes a known motion acceleration or deceleration time of a piece of the laser braze/weld equipment and allows for an automatic ramping up of a Signal Value during the known motion acceleration or deceleration time. In the second adaptive control method, a Signal Value will start at a first value and will ramp up linearly to a commanded value during the known motion acceleration time, or will start at a current value and ramp down linearly to a user defined ramp end value during the known motion deceleration time, or both. Thus, for shorter acceleration or deceleration times, the ramp slope will be relatively higher, and for longer acceleration or deceleration times, the ramp slope will be relatively lower. In this second adaptive control method, it is not necessary for a user to know the actual motion acceleration and deceleration times. Instead, the present invention allows for the adaptive control ramping to occur automatically during the acceleration times during Arc Start or during the deceleration times during Arc End. This second adaptive control method is known as an Automatic Ramp control method.

A third adaptive control method allows a user to specify an adaptive control time value to be implemented in synchronization with the motion start timing. In the third adaptive control method, a Signal Value will start at a first value and will ramp up linearly to a user defined ramp end value during the user specified adaptive control time during acceleration of a piece of the laser braze/weld equipment, or will start at a current value and will ramp down linearly to a commanded value during the user specified adaptive control time during deceleration of the equipment or both. Thus, for shorter user-selected acceleration and deceleration times, the ramp slope will be relatively higher, and for longer user-selected acceleration times, the ramp slope will be relatively lower. The ramping will begin in synchronization with the motion start timing, thereby allowing the ramp to occur after tool motion has commenced. This third adaptive control method is known as a User Ramp control method.

A fourth adaptive control method utilizes a motion acceleration and deceleration time of a piece of the laser braze/weld equipment and allows for an automatic ramping up of a Signal Value during the known motion acceleration and deceleration time in synchronization with the motion start timing. The ramp time is the motion acceleration time at Arc Start or the motion deceleration time at Arc End. Thus, the ramp start timing is synchronized with the motion start timing at Arc Start or is synchronized with motion end timing at Arc End. In this fourth adaptive control method, a Signal Value will start at a specified first value and will ramp up to a commanded value during the known motion acceleration time, or will ramp from a current value to the specified end value at Arc End, or both, each in accordance with the actual motion speed profile during acceleration and deceleration. Because the ramp up is based on actual acceleration times, the ramp up may be non-linear. The ramping may begin in synchronization with the motion start timing or with the motion stop timing, thereby allowing the ramp to occur after tool motion has commenced or ceased, as desired. This fourth adaptive control method is known as a Speed Ramp control method.

The process signal timing sequence of FIG. 3 also synchronizes the timing control between all process parameters during the laser braze/weld operation. To ensure that the Arc Started time 32 coincides with the weld start motion command 52, the present invention accounts for a time latency $t'_1$ between the Arc Starting time 30 and the Arc Started time 32. Thus, the Arc Started time 32 is specified as the Arc Starting time 30 plus the time latency $t'_1$. In other words, the Arc Start signal, shown in timeline 160 of FIG. 3, must be commanded in advance of the expected Arc Started time 32 by the amount of the time latency $t'_1$. Similarly, the Arc End signal, shown in the timeline 170, must be commanded in advance of the Arc Ended time 36 by an amount of the time latency $t'_7$. It is understood that time latency $t'_1$ may or may not be equal to the time latency $t'_7$. It is also understood that the time latency $t'_1$ may be independent of the time latency $t'_7$, which is why the Arc Start signal 160 is controlled by a separate channel than the Arc End signal 170.

For any process control parameter A utilized in the brazing/welding operation shown in FIG. 3, both a Signal Value channel, shown as timeline 180, and a Signal On channel, shown as timeline 190, are provided, because each process control parameter is associated with its own signal value, and because each process or control associated with the brazing/welding operation is subject to an independent and known time latency associated with that process parameter. For example, a process control parameter associated with a laser requires a Signal Value channel to control a process parameter associated with the laser, such as laser power level, and further requires a Signal On channel to indicate when the laser will be turned on or off. Additionally, for the process control parameter A, a known time latency $t'_2$ exists that represents the delay time of the Signal Value and the realization of the signal value in advance of the Arc Started time 32. For example, the process control parameter Signal Value channel may call for 50% laser power when the laser turns on, but that power setting must be set in advance of the laser being actually turned on. Thus, according to the present invention, the control system adjusts the time latency $t'_2$ in relation to the Arc Start time latency $t'_1$ to achieve a desired Signal Value 180 in advance of the Arc Starting time 32.

Similarly, when any change to the process parameter Signal Value is made, a known time latency $t'_5$ exists that represents the delay time of the Signal Value change in advance of the actual change to the Signal Value. Thus, as shown in FIG. 3, the Signal Value change on timeline 180 is called for at the Arc Ending time 34, but does not take effect until a time $t'_5$ after the Arc Ending time 34. Thus, the control channel 180 accounts for the time latency $t'_5$ associated with the change to the Signal Value of the process parameter in relation to the time latency $t'_7$ to achieve a desired Signal Value 180 in advance of the Arc Ended time 36. As seen in FIG. 3, the Arc Ending signal of timeline 170 is provided a time $t'_7$ prior to the Arc Ended time 36, which also coincides with a time $t'_4$ prior to a Motion Line signal end signal on timeline 150. The Arc Ending Signal is also made a time $t'_5$ prior to the Signal Value change relative to the Arc Ended time 36.

In the same way, the present invention accounts for an independent time latency $t'_3$ that exists between the Arc Starting signal 30 and the time the Signal On channel signal turns on in timeline 190 to ensure that the Signal On channel turns on precisely at the Arc Started time 32. Thus, the present invention allows the control system to adjust the Signal On time latency $t'_3$ in relation to the Arc Start time latency $t'_1$ to synchronize the Signal On channel on signal with the Arc Started time 32. In the same way, the present invention accounts for the time latency $t'_6$ of the Signal On channel in relation to the Arc End signal time latency to ensure that the Signal On channel 190 turns off at precisely the Arc Ended time 36.

In a further embodiment, a user is provided with a user-selectable time delay that allows the user to manually adjust the control system by adding the user-selectable time delay to any time latency associated with a control channel. This user-selectable time delay provides a user with the ability to manually fine tune and adjust control of the adaptive control ramp up delay time relative to the commanded motion start time. The user-selectable time delay is intended to allow the user to account for tolerance stack up issues within the robot laser braze/weld operation. As a non-limiting example, the user-selectable time delay may be used to account for mechanical delay to the actual motion start time in relation to the commanded motion start time that are caused by gear backlash.

Importantly, each control channel independently accounts for any time latency associated with that control channel, which is necessary because each of the time latencies $t'_2$, $t'_3$, $t'_5$ and $t'_6$ are independent of each other. Thus, the present invention provides precise signal timing adjustment capability through the Signal Value channel, which optimizes the precision and utility of the laser braze/weld process by synchronizing the timing control between all process parameters during the laser braze/weld operation. Moreover, each control channel is able to provide its own On and Off control parameters through the Signal On channel, including using adaptive process parameter control as desired. Thus, any process parameter associated with the brazing/welding operation may be precisely controlled, in addition to the process parameter timing. In one embodiment, the present invention therefore allows adaptive controls of process parameters associated with the laser braze/weld operation as a function of the Arc Starting time 30 and the Arc Ending time 36.

FIG. 4 provides an exemplary process signal timing sequence for a laser braze/weld operation for two process parameters in FINE move type at Arc Starting time 30 and at Arc Ended time 36. In a laser braze/weld operation of the type shown in FIG. 4, the weld parameters must be dynamically updated based on the actual weld speed to guarantee laser weld quality. During acceleration of the robot welding tool, it is desirable to provide independent ramp control for process parameters based on actual robot acceleration or deceleration at the start or at the end of the laser braze/weld operation. The ability to adapt the braze/weld process parameters to the weld speed is critical in laser applications where the laser can quickly cut a hole in the material being welded or feed more wire than is needed. Without the adaptive capability, the developing, programming, and validating of the weld schedules is tedious, time consuming and difficult.

As above, each channel of FIG. 4 has independent control, each channel has similar control capability, and each channel further accounts for only specific time latencies associated with the process parameter controlled by that channel. The brazing/welding speed of timeline 240 shows a desired variable weld speed through a tool motion adjustment, shown in timeline 250. Each additional control channel allows for dynamic control of a process parameter in relation to the weld speed timeline 240. The Arc Start signal is shown in timeline 260, and the Arc End signal is shown in timeline 270. Control of a laser power Signal Value parameter is shown in timeline 280, and control of a wire feed speed Signal Value parameter is shown in timeline 310. Control of a laser Signal On parameter is shown in timeline 290, and control of a wire feed Signal On parameter is shown in timeline 320.

The Arc Start timeline begins with an Arc Start, signal 262 that provides the timing basis for all actions taken with respect to any of the process parameters shown in FIG. 4 in relation to the Arc Started time 32. The Arc End timeline controls the end of the laser braze/weld operation by initiating the Arc Ending time 34 with an Arc End signal at 272 that provides the timing basis for all actions taken with respect to any of the process parameters in FIG. 4 in relation to the Arc Ended time 36.

Thus, the weld motion line receives an "off" signal 252 that coincides with a first taught position of the robot at time 300, shown as (Arc Starting time $30+T_1$), where $T_1$ is the time latency of the motion control. Instead of abruptly stopping, which may be physically impossible, the Weld speed anticipates and adapts to the motion characteristics of the tool adaptively reducing the Weld Speed at 242 to ensure that the weld speed is zero concurrently with the motion stop signal 252 at (Arc Starting time 30+$T_1$), the in-position time 300. Concurrently, the laser power Signal Value parameter and the wire feed speed Signal Value parameter are both controlled as a function of the Arc Starting time 30. In particular, the laser power level is adjusted at 282 at (Arc Starting 30+$T_3$), where $T_3$ is the time latency of the laser power control. Similarly, the wire feed control speed is adjusted at 312 at (Arc Starting 30+$T_4$), where $T_4$ is the time latency of the wire feed speed control. The Laser On (Signal On) parameter receives an "on" signal at (Arc Starting 30+$T_5$), where $T_5$ is the time latency of the laser. Similarly, the Wire Feed Speed On (Signal On) parameter receives an on signal at (Arc Starting 30+$T_6$), where $T_6$ is the time latency of the wire feed device. A time $T_7$ accounts for latency associated with movement of the laser device after receipt of the on signal. In this way, all time latencies associated with any of the process parameters related to the laser braze/weld operation are accounted for in relation to the Arc Starting time 30. The control of each of the parameters is therefore independently enabled at an extremely high level of precision.

At the Arc Started time 32, the Motion channel sends an "on" signal at 254 coinciding with the Arc Started time 32, which is also matched by an adaptive increase in Weld speed at 244, in laser power at 284, and in wire feed speed at 314. Subsequently, the Motion channel 250 receives an "off" signal 256 that coincides with a taught position reached by the robot at time 302 defined as (Arc Ending+$T_2$), where $T_2$ is the time latency of the Motion "off" control. The "off" signal 256 is anticipated by an adaptive reduction 246 of the Weld speed, of the laser power 286, and of the wire feed speed 316, to ensure that the process parameters adaptively change as the Weld speed reduces to zero concurrently with the motion stop signal 256 at (Arc Ending 34+$T_2$), the in-position time 302. The laser power control receives an "off" signal at a time (Arc Ending 34+$T_8$), where $T_8$ is the time latency of the laser power control parameter. The wire feed speed control receives an "off" signal at a time (Arc Ending 34+$T_{11}$) where $T_{11}$ is the time latency of the wire feed speed control parameter. Similarly, the laser on control parameter receives an off signal at a desired time (Arc Ending 34+$T_9$), where $T_9$ is the time latency of the laser on control parameter, and the wire feed speed on control parameter receives an off signal at a desired time (Arc Ending 34+$T_{10}$), where $T_{10}$ is the time latency of the wire feed speed on control. Finally, the Motion channel 250 additionally receives an "on" signal at 258 coincident with the Arc Ended time 36 that is matched by an adaptive increase 248 of Weld speed as the tool repositions itself.

Each of the process parameters of FIG. 4 are therefore easily controlled both with respect to any time latencies of each process parameter and further allows for dynamic adjustment of other process parameters associated with the laser braze/weld operation with respect to any changes in the actual weld speed, including with respect to any weld speed changes due to acceleration or deceleration of the tool. It is understood that the illustrated process control timing and adaptive controls can be extended to any additional channels associated with any additional process parameter, such as dual wire feed, gas flow and speed, wire temperature/preheat, and the like. The present invention therefore maximizes a weld quality and minimizes a difficulty of developing, programming, and validating weld schedules for any part to be joined by a laser braze/weld operation.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A method for adaptive control of a robotic operation performed by a robot carrying a tool comprising at the steps of:
   providing a software program executable by a controller controlling movement of the robot and operation of the tool to perform the robotic operation, the controller executing the software program to generate process signals including execution commands;
   providing a Signal Value channel and a Signal On channel for a control process parameter of the robot associated with the operation of the tool, wherein the Signal Value channel is subject to a first time latency and the Signal On channel is subject to a second time latency, wherein each of the first time latency and the second time latency is a difference between a time that an associated execution command is initially generated by the controller and a time that the associated execution command begins executing to operate the tool;
   synchronizing execution timing of the associated execution command in the Signal Value channel and the Signal On channel with a motion execution command for the tool by accounting for the first time latency and the second time latency in relation to the associated execution command; and
   running the software program to generate the process signals from the controller and sending the process signals to the robot and the tool to implement the synchronized execution timing of the operation of the tool by controlling the movement of the robot according to the motion execution command.

2. The method of claim 1 wherein during the synchronizing step a start of the execution timing of a signal value execution command in the Signal Value channel is delayed by the amount of the first time latency upon receipt of the signal value execution command from the controller.

3. The method of claim 2 wherein during the synchronizing step an end of the execution timing of the signal value execution command in the Signal Value channel is delayed by an amount of a third time latency upon receipt of the signal value execution command from the controller.

4. The method of claim 3 wherein during the synchronizing step a start of the execution timing of a turn on execution command in the Signal On channel is delayed by the amount of the second time latency upon receipt of the turn on execution command from the controller.

5. The method of claim 4 wherein during the synchronizing step an end of the execution timing of the turn on execution command in the Signal On channel is delayed by an amount of a fourth time latency upon receipt of the turn on execution command from the controller.

6. A method for adaptive control of a robotic laser braze/weld operation performed by a robot carrying a laser braze/weld tool comprising the steps of:
   providing a software program executable by a controller controlling movement of the robot and operation of the tool to perform the robotic operation, the controller executing the software program to generate process signals including execution commands specified in a weld schedule;

providing a Signal Value channel and a Signal On channel for a laser braze/weld control process parameter of the robot associated with the operation of the tool, wherein the Signal Value channel is subject to a first time latency and the Signal On channel is subject to a second time latency, wherein each of the first time latency and the second time latency is a difference between a time that an associated execution command is initially generated by the controller and a time that the associated execution command begins executing to operate the tool;

synchronizing execution timing of the associated execution command in the Signal Value channel and the Signal On channel with a motion execution command for the tool by accounting for the first time latency and the second time latency in relation to the associated execution command; and running the software program to generate the process signals from the controller and sending the process signals to the robot and the tool to implement the synchronized execution timing of the operation of the tool by controlling the movement of the robot according to the motion execution command.

7. The method of claim 6, further comprising the steps of:
tracking an actual speed of the tool during the robotic laser braze/weld operation; and
providing independent and adaptive control of the Signal Value channel and the Signal On channel in relation to the speed of the tool.

8. The method of claim 6, wherein the control process parameter is one of laser power, laser on/off; wire feed speed, wire feed on/off; dual wire feed speed, dual wire feed on/off; gas flow, gas flow on/off; gas speed, gas pressure, gas temperature, wire temperature, wire preheat, and wire preheat on/off.

9. The method of claim 6, wherein the step of synchronizing execution timing is automatically updated in response to a change in the weld schedule.

10. The method of claim 6, further comprising the steps of:
providing the Signal Value channel being subject to a third time latency in relation to an end of the associated execution command;
providing the Signal On channel being subject to a fourth time latency in relation to an end of the associated execution command; and
synchronizing execution timing by accounting for the third time latency and the fourth time latency in relation to the associated execution commands.

11. The method of claim 10, further comprising the steps of:
tracking an actual speed of the tool during the laser braze/weld operation; and
providing independent and adaptive control of the first Signal Value channel and the Signal On channel in relation to the speed of the tool.

12. The method of claim 11, wherein the step of synchronizing execution timing is automatically updated in response to a change in the weld schedule.

13. The method of claim 12, wherein the weld schedule includes a laser braze/weld start command and a laser braze/weld end command, and wherein execution of the first Signal Value channel is automatically adaptively controlled in response to acceleration in response to the laser braze/weld start command, and wherein execution of the first Signal Value channel is automatically adaptively controlled in response to deceleration in response to the laser braze/weld end command.

14. An apparatus for adaptive control of a robotic laser braze/weld operation comprising:
a robot controller;
a robot arm carrying a laser brazing/welding tool, the robot arm and the tool being connected to the robot controller for receiving process signals from the robot controller;
a non-transitory memory device connected to the controller and storing a software program executed by the controller for coordinating a movement of the robot and operation of the tool, the software program executable by the robot controller during the robotic operation to generate the process signals including execution commands specified in a weld schedule;
a Signal Value channel and a Signal On channel for an associated execution command, the Signal Value channel being subject to a first time latency and the Signal On channel being subject to a second time latency, wherein each of the first time latency and the second time latency is a difference between a time that the associated execution command is initially generated by the controller and a time that the associated execution command begins executing to operate the tool; and
wherein during execution of the software program the controller generates the process signals to the robot and the tool to implement synchronized execution timing of the associated execution command in the Signal Value channel and the Signal On channel by accounting for the first time latency and the second time latency to control a movement of the robot.

15. The apparatus of claim 14, wherein the software program tracks an actual speed of the tool and provides independent and adaptive control of the Signal Value channel and the Signal On channel in relation to the actual speed of the tool.

16. The apparatus of claim 15, wherein the software program automatically updates and synchronizes execution timing of the Signal Value channel and the Signal On channel in response to a change in the weld schedule.

17. The apparatus of claim 14, further comprising:
the Signal Value channel being subject to a third time latency in relation to and end of the associated execution command;
the Signal On channel being subject to a fourth time latency in relation to and end of the associated execution command; and
wherein execution of the software program synchronizes execution timing of the associated execution commands by accounting for the third time latency and the fourth time latency.

18. The apparatus of claim 17, wherein the software program tracks an actual speed of the tool and provides independent and adaptive control of the Signal Value channel and the Signal On channel in relation to the actual speed of the tool.

19. The apparatus of claim 18, wherein the control process parameter is one of laser power, laser on/off; wire feed speed, wire feed on/off; dual wire feed speed, dual wire feed on/off; gas flow, gas flow on/off; gas speed, gas pressure, gas temperature, wire temperature, wire preheat, and wire preheat on/off.

20. The apparatus of claim 18, wherein the software program provides independent and adaptive control of the Signal Value channel by applying to the Signal Value channel one of a proportional control method, a Zero Ramp control method, an Automatic Ramp control method, a User Ramp control method, and a Speed Ramp control method.

* * * * *